United States Patent [19]
Jensen

[11] Patent Number: 5,699,397
[45] Date of Patent: Dec. 16, 1997

[54] TOOL FOR VERTICALLY SUPPORTING TIE ROD ASSEMBLY AGAINST CLEVIS PIN ON GUSSET PLATE IN BOILING WATER REACTOR

[75] Inventor: Grant Clark Jensen, Morgan Hill, Calif.

[73] Assignee: General Electric Company, San Jose, Calif.

[21] Appl. No.: 532,200

[22] Filed: Sep. 22, 1995

[51] Int. Cl.$^6$ .................................................. G21C 1/01
[52] U.S. Cl. ........................... 376/463; 376/260; 376/81; 376/271; 376/372
[58] Field of Search ............... 376/260, 81, 463, 376/271, 372; 29/273

[56] References Cited

U.S. PATENT DOCUMENTS

| | | | |
|---|---|---|---|
| 4,043,705 | 8/1977 | Schlosser | 417/151 |
| 4,053,356 | 10/1977 | Brammer, Jr. | 376/263 |
| 4,292,130 | 9/1981 | Viaud et al. | 376/262 |
| 4,986,953 | 1/1991 | Bernard | 376/245 |
| 4,995,158 | 2/1991 | Howell et al. | 29/723 |
| 5,084,231 | 1/1992 | Dixon et al. | 376/271 |

Primary Examiner—Charles T. Jordan
Assistant Examiner—Meena Chelliah
Attorney, Agent, or Firm—James E. McGinness; Dennis M. Flaherty

[57] ABSTRACT

A tool for vertically supporting a shroud repair tie rod assembly having a clevis hook by bracing the clevis hook against a clevis pin installed in a gusset plate. This allows the vertical support at the upper end of the tie rod assembly to be removed, so that the upper support structure can be coupled to the tie rod. The lower end of the tie rod assembly is supported on both sides of the gusset plate. The tool for vertically supporting the lower end of the tie rod assembly is designed to fit in the narrow space bounded by a jet pump diffuser, the gusset plate and the reactor pressure vessel. The vertical support tool includes a pole adaptor for coupling to the end of a service pole, a pole adaptor extension having one end connected to the pole adaptor, a mounting block connected to the other end of the pole adaptor extension, and a hydraulic spreader mounted on the mounting block. The hydraulic spreader opens in response to actuation of a hydraulic cylinder. In the open position, an upper surface of the pivoting member bears against a bottom surface of the clevis hook with sufficient force to vertically support the tie rod assembly against the clevis pin.

16 Claims, 5 Drawing Sheets

1

TOOL FOR VERTICALLY SUPPORTING TIE ROD ASSEMBLY AGAINST CLEVIS PIN ON GUSSET PLATE IN BOILING WATER REACTOR

FIELD OF INVENTION

This invention relates to tooling which is useful in installing hardware in a nuclear reactor. In particular, the invention relates to tooling for installing hardware for stabilizing the core shroud of a nuclear reactor to resist deflection in response to a seismic event and/or loss-of-coolant accident (LOCA).

BACKGROUND OF INVENTION

As seen in FIG. 1, a conventional boiling water reactor has a reactor pressure vessel 10 and a core shroud 12 arranged concentrically in the RPV with an annular region 8, commonly referred to as the "downcomer annulus", therebetween. The core shroud 12 is a stainless steel cylinder surrounding the nuclear fuel core comprising a plurality of fuel bundle assemblies (not shown). Each array of fuel bundle assemblies is supported at the top by a top guide and at the bottom by a core plate. During operation of the reactor, water is continuously recirculated down the downcomer annulus 8 and then up through the core. This flow is induced by a multiplicity of jet pumps located in the downcomer annulus and driven by recirculation pumps (not shown) outside the reactor pressure vessel.

The core shroud 12 comprises a shroud head flange 12a for supporting the shroud head 22; a circular cylindrical shroud head flange 12a; an annular top guide support ring 12c welded to the bottom end of upper shroud wall 12b; a circular cylindrical middle shroud wall comprising three sections 12d, 12e and 12f welded in series, with a top end of section 12d being welded to top guide support ring 12c; and an annular core plate support ring 12g welded to the bottom end of middle shroud wall section 12f and to the top end of a lower shroud wall 12h. The entire shroud is supported by a shroud support 14, which is welded to the bottom of lower shroud wall 12h, and by annular shroud support plate 16, which is welded at its inner diameter to shroud support 14 and at its outer diameter to RPV 10.

In the event of a seismic disturbance, it is conceivable that the ground motion will be translated into lateral deflection relative to the reactor pressure vessel of those portions of the shroud located at elevations above shroud support plate 16. Such deflections would normally be limited by acceptably low stresses on the shroud and its weldments. However, if the shroud weld zones have failed due to stress corrosion cracking, there is the risk of misalignment and damage to the core and the control rod components, which would adversely affect control rod insertion and safe shutdown.

Stress corrosion cracking in the heat affected zone of any shroud girth seam welds diminishes the structural integrity of shroud 12, which vertically and horizontally supports the core top guide and the shroud head 22. In particular, a cracked shroud increases the risks posed by a loss-of-coolant accident (LOCA). During a LOCA, the loss of coolant from the reactor pressure vessel produces a loss of pressure above the shroud head 22 and an increase in pressure inside the shroud, i.e., underneath the shroud head. The result is an increased lifting force on the shroud head and on the upper portions of the shroud to which the shroud head is bolted. If the core shroud has fully cracked girth welds, the lifting forces produced during a LOCA could cause the shroud to separate along the areas of cracking, producing undesirable leaking of reactor coolant.

A repair method for vertically restraining a weakened core shroud utilizes tensioned tie rods 54 coupled to the shroud flange 12a and to the shroud support plate 16, as seen in FIG. 1. The lower end of the tie rod/lower spring assembly hooks underneath a clevis pin 20 inserted in a hole machined into gusset plate 18, which plate is in turn welded to shroud support plate 16 and RPV 10. In addition, the shroud 12 is restrained laterally by installation of wishbone springs 56 and 72, which are components of the shroud repair assembly.

Referring to FIG. 1, the shroud restraint tie rod/lower spring assembly comprises a tie rod 54 having a circular cross section. A lower end of tie rod 54 is anchored in a threaded bore formed in the end of a spring arm 56a of lower spring 56. Tie rod 54 extends from the end of spring arm 56a to a position adjacent the outer circumferential surface of the top guide support ring 12c. The upper end of tie rod 54 has a threaded portion.

The lower spring 56 is anchored to a gusset plate 18 attached to the shroud support plate 16. The lower spring 56 has a slotted end which straddles gusset plate 18 (see FIG. 5) and forms a clevis hook 56c. The clevis hooks under opposite ends of a clevis pin 20 inserted through a hole machined in gusset plate 18. Engagement of the slotted end 56c with the gusset plate 18 maintains alignment of lower spring 56 under the action of seismic motion of the shroud, which may be oblique to the spring's radial orientation.

The tie rod 54 is supported at its top end by an upper support assembly 62 which hangs on the shroud flange 12a. A pair of notches or slots are machined in the shroud head ring 22a of shroud head 22. The notches are positioned in alignment with a pair of bolted upper support plate segments 64 of upper support assembly 62 when the shroud head 22 is properly seated on the top surface of shroud flange 12a. These notches facilitate coupling of the tie rod assembly to the shroud flange.

The pair of notches at each tie rod azimuthal position receive respective hook portions 64a of the upper support plates 64. Each hook 64a conforms to the shape of the top surface of shroud flange 12a and the shape of the steam dam 24. The distal end of hook 64a hooks on the inner circumference of shroud dam 24.

The upper support plates 64 are connected in parallel by a top support bracket (not shown) and a support block 66 which forms the anchor point for the top of the tie rod. Support block 66 has an unthreaded bore, tapered at both ends, which receives the upper end of tie rod 54. After the upper end of tie rod 54 is passed through the bore, a threaded nut 70 is torqued onto the upper threaded portion of the tie rod 54.

As seen in FIG. 1, the assembly comprised of support plates 64 with hooks 64a, support block 66, tie rod 54, lower spring 56, clevis pin 20 and gusset plate 18 form a vertical load path by which the shroud flange 12a is connected to the shroud support plate 16. In the tensioned state, the upper support plates 64 exert a restraining force on the top surface of shroud flange 12a which opposes separation of the shroud 12 at any assumed failed circumferential weld location.

Lateral restraint at the elevation of the top guide support ring 12c is provided by an upper spring 72 having a double cantilever "wishbone" design. The end of the radially outer arm of upper spring 72 has an upper contact spacer 74 rotatably mounted thereon which bears against the inner surface of the wall of RPV 10.

Spring arm 56a of lower spring 56 laterally supports the shroud 12 at the core plate support ring 12g, against the vessel 10, via a lower contact spacer 76. The top end of spring arm 56a has a threaded bore to provide the attachment for the threaded bottom end (not shown) of tie rod 54. The member 56d connecting the wishbone spring arms 56a, 56b to clevis hook 56c is offset from the line of action between the lower end of tie rod 54 and clevis pin 20 to provide a vertical spring compliance in the load path to the tie rod. A middle support 80 is preloaded against the vessel wall at assembly by radial interference which bends the tie rod 54, thereby providing improved resistance to vibratory excitation failure of the tie rod.

During installation of the shroud repair hardware shown in FIG. 1, the tie rod/lower spring assembly comprising tie rod 54 screwed into lower spring 56 is suspended from a cable and lowered into the annulus to the desired elevation. The lower spring clevis 56c is allowed to "drift" under the clevis pin 20. The tie rod assembly is now properly positioned and simply lifted up to engage the clevis pin. After clevis hook 56c has been hooked under clevis pin 20, the lower end of the tie rod assembly is braced in the hooked position and the upper end of the tie rod assembly is uncoupled from the hoisting cable to allow the upper support assembly 62 to be installed, followed by upper spring 72.

SUMMARY OF THE INVENTION

The present invention is a tool for vertically supporting a shroud repair tie rod assembly by bracing its clevis hook against a clevis pin installed in the gusset plate. This allows the vertical support at the upper end of the tie rod assembly to be removed, after which the upper support structure can be installed.

In accordance with the method of the present invention, the lower end of the tie rod assembly is supported on both sides of the gusset plate. The tool for vertically supporting the lower end of the tie rod assembly is designed to fit in a narrow space bounded by the jet pump diffuser, gusset plate and reactor pressure vessel.

In accordance with the preferred embodiment of the invention, the vertical support tool comprises a pole adaptor for coupling to the end of a service pole, a pole adaptor extension having one end connected to the pole adaptor, a mounting block connected to the other end of the pole adaptor extension, and a hydraulic spreader mounted on the mounting block. The hydraulic spreader, which resembles a duckbill, has a fixed member attached to the mounting block and a pivoting member which pivots away from the fixed member in response to actuation of a hydraulic cylinder. In the open position, an upper surface of the pivoting member bears against a bottom surface of the clevis hook with sufficient force to vertically support the tie rod assembly against the clevis pin.

In accordance with the present invention, the tool for vertically supporting the tie rod assembly can be installed and operated remotely. The tool is positioned by attaching the tool to the end of a service pole and then manipulating the handle of the service pole from a station on the refueling bridge. The tool is operated by actuating the supply of pressurized fluid, e.g., water, to the hydraulic cylinder. Preferably, respective vertical support tools, each made in accordance with the invention, are installed on opposite sides of the gusset plate to vertically support both arms of the clevis hook.

DETAILED DESCRIPTION OF THE PREFERRED EMBODIMENT

During the installation procedure, the tie rod/lower spring assembly (items 54 and 56 in FIG. 2) is lowered into the downcomer annulus 8. This is accomplished using a crane (not shown) on the refueling floor of the reactor. First, the tie rod/lower spring assembly must be raised from horizontal position on the refueling floor to a vertical position suspended from the end of the crane cable. This is accomplished by means of a tie rod adaptor which couples the upper end of the tie rod to the end of the cable. When the cable is wound, the upper end of the tie rod is lifted off the refueling floor into an upright position with all of the weight of the tie rod being supported by the cable. The tie rod/lower spring assembly can then be lowered into the annulus by unwinding the cable.

Figure 1:
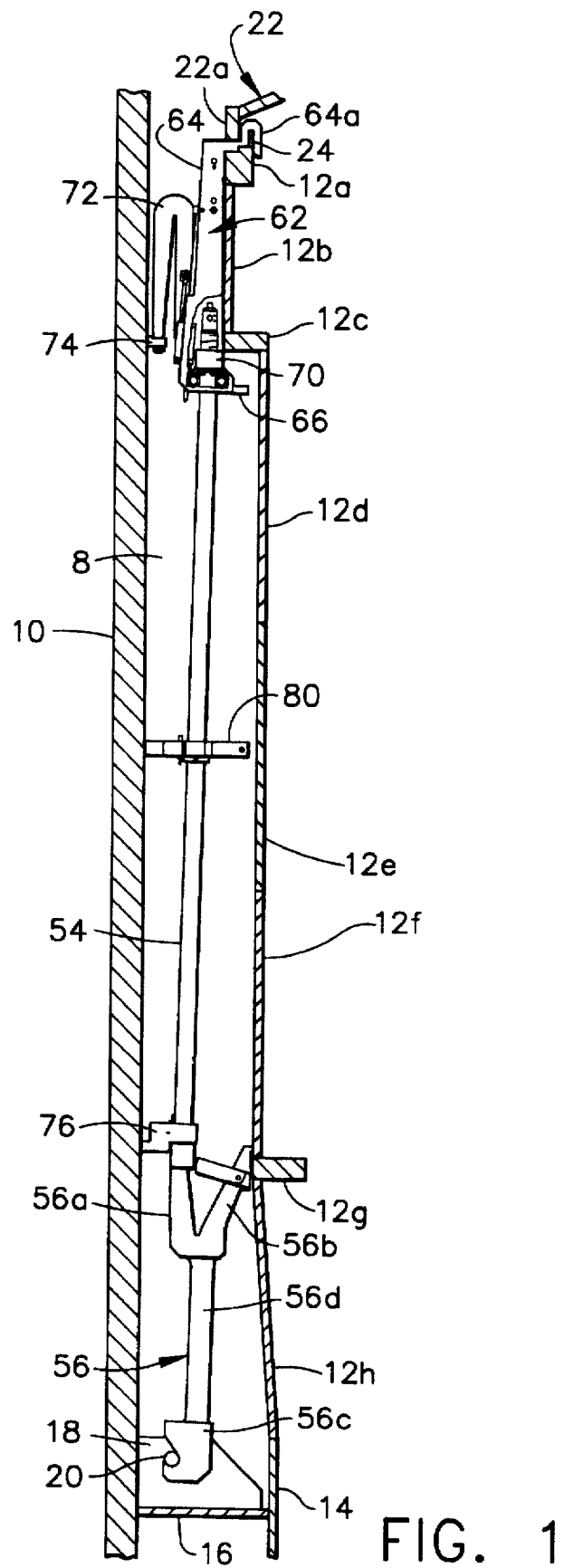
FIG. 1 is a sectional elevational view of core shroud repair hardware comprising a tie rod assembly for vertically restraining the shroud and wishbone springs for laterally restraining the shroud at the elevations of the top guide support ring and the core plate.
Figure 2:
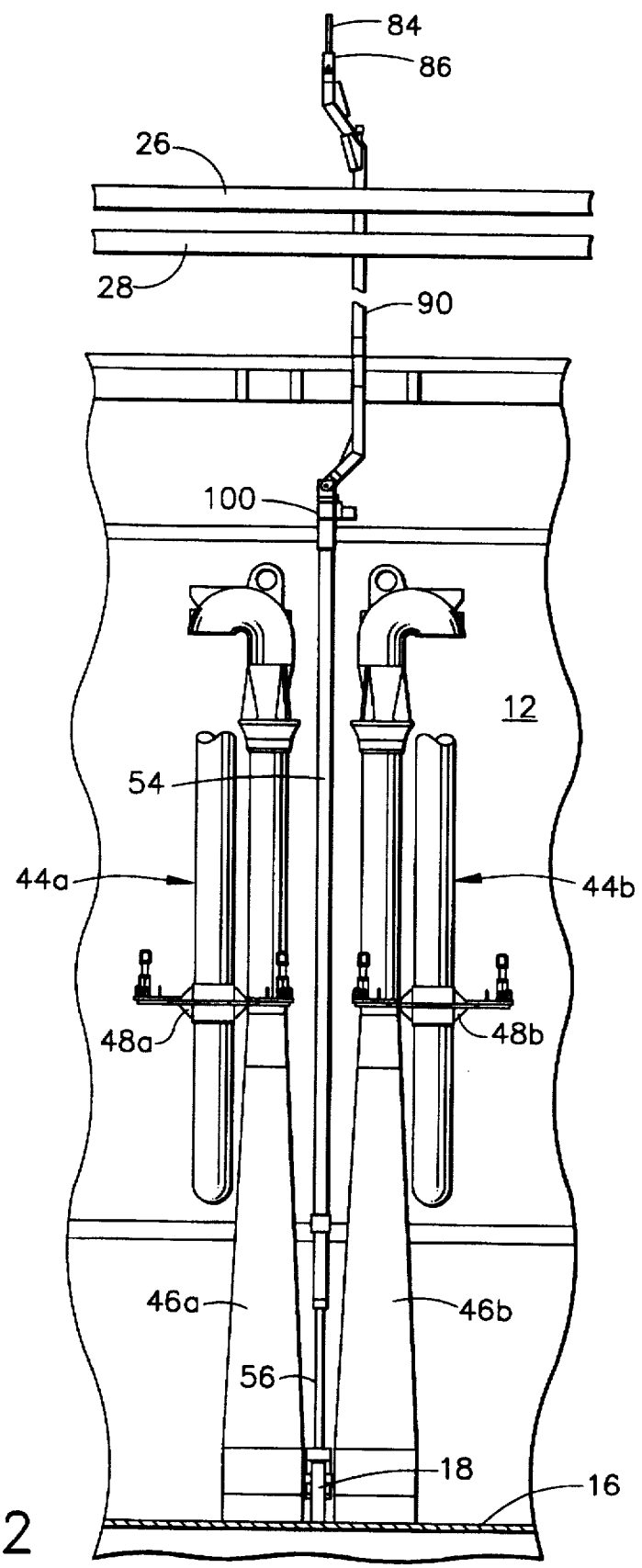
FIG. 2 is a radial elevational view showing the position of a tie rod/lower spring assembly relative to a pair of adjacent jet pump assemblies in one type of BWR.

Referring to FIG. 2, when vertical access to the downcomer annulus 8 is limited by internal reactor structures such as the feedwater sparger 26 and core spray header 28, a rigid frame or strongback 90 can be used to bypass the obstruction. The strongback is designed to circumvent the piping obstructions so that the tie rod/lower spring assembly is freely suspended from the end of the cable and the cable remains plumb. The tie rod strongback 90 is suspended from cable 84 via a cable adaptor 86 at its upper end. The lower end of the strongback 90 is coupled to the tie rod adaptor 88, which in turn couples to the top of the tie rod 54.

Figure 5:
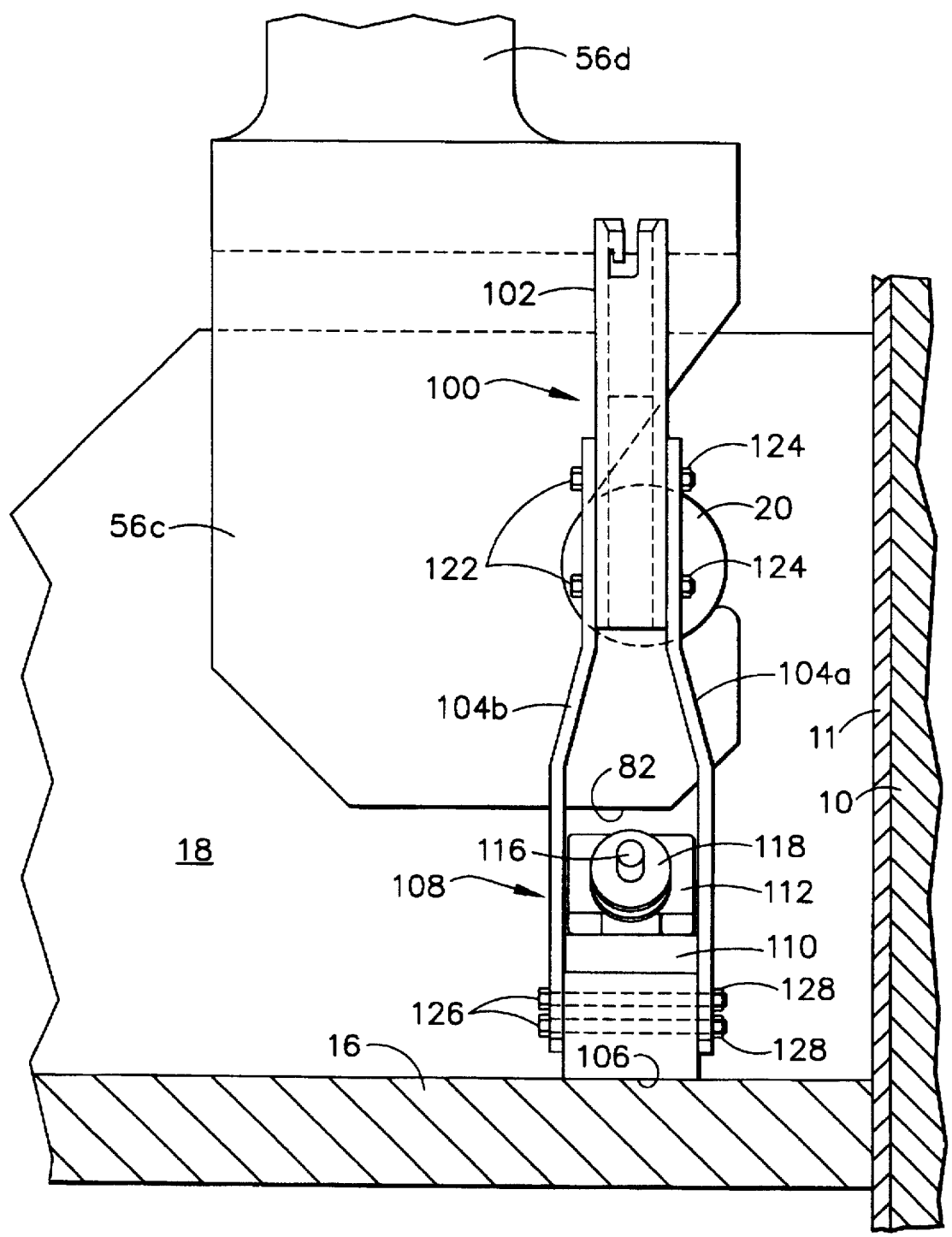
FIG. 5 is an end view of the tool of FIG. 4 in its closed state, the pole adaptor again being depicted in section.

As the cable is lowered, the tie rod/lower spring assembly 54/56 must be guided into the narrow space between adjacent jet pump assemblies 44a and 44b (see FIG. 2). Maneuvering of the tie rod/lower spring assembly must be done with extreme care to avoid damaging reactor hardware such as the jet pump restrainer brackets 48a, 48b and the jet pump sensing lines (not shown). At the desired elevation, the lower spring clevis 56c is allowed to "drift" under the clevis pin 20. Then the tie rod assembly is lifted up to engage the clevis pin, as shown in FIGS. 2 and 5. After clevis hook 56c has been hooked under clevis pin 20, the lower end of the tie rod assembly is braced in the hooked position using the tool of the present invention.

Figure 3:
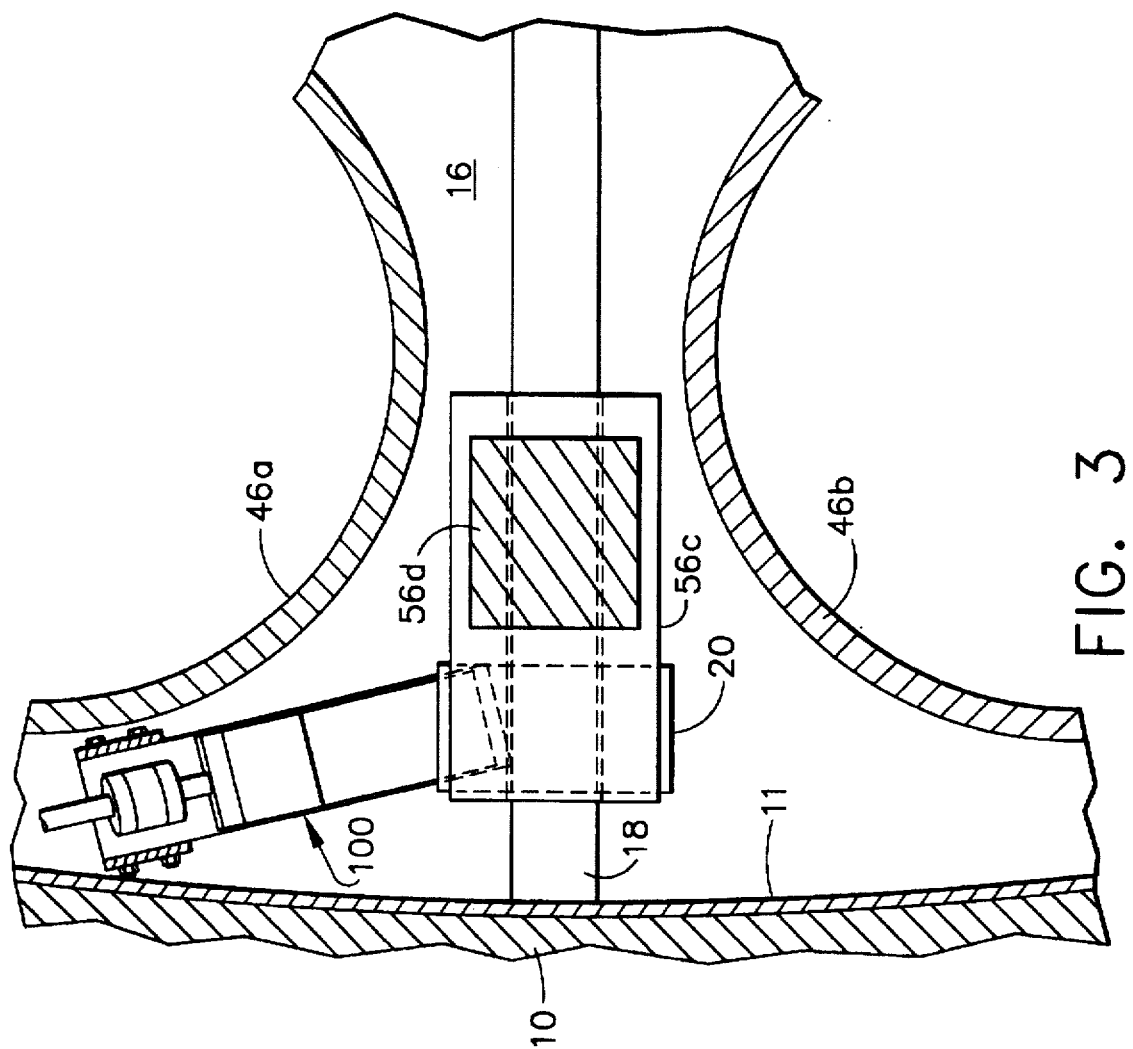
FIG. 3 is a plan view showing the position of a tool for vertically supporting the tie rod/lower spring assembly when hooked under the clevis pin of a gusset plate in accordance with the present invention.

Referring to FIG. 3, the vertical support tool 100 in accordance with the invention has a small footprint which allows it to fit inside the narrow space bounded by the jet pump diffuser 46a, the gusset plate 18 and the reactor pressure vessel wall 10, the internal surface of which is covered with cladding 11. The vertical support tool 100 is positioned so that a portion thereof lies underneath the portion of the clevis pin 20 extending outward on one side of the gusset plate 18. In practice, it has been necessary to orient the vertical support tool at an angle which deviates slightly from being perpendicular to the gusset plate 18 due to the obstruction presented by the jet pump diffuser 46a.

In accordance with the preferred embodiment of the invention, a second vertical support tool (not shown) is installed on the other side of the gusset plate in a similar positional relationship to the clevis pin 20 and the diffuser 46b. Each vertical support tool supports the full weight of the tie rod assembly so that the upper end of the tie rod assembly can be disconnected from the hoisting cable. Used in unison, the pair of vertical support tools provide a redundant system.

Figure 4:
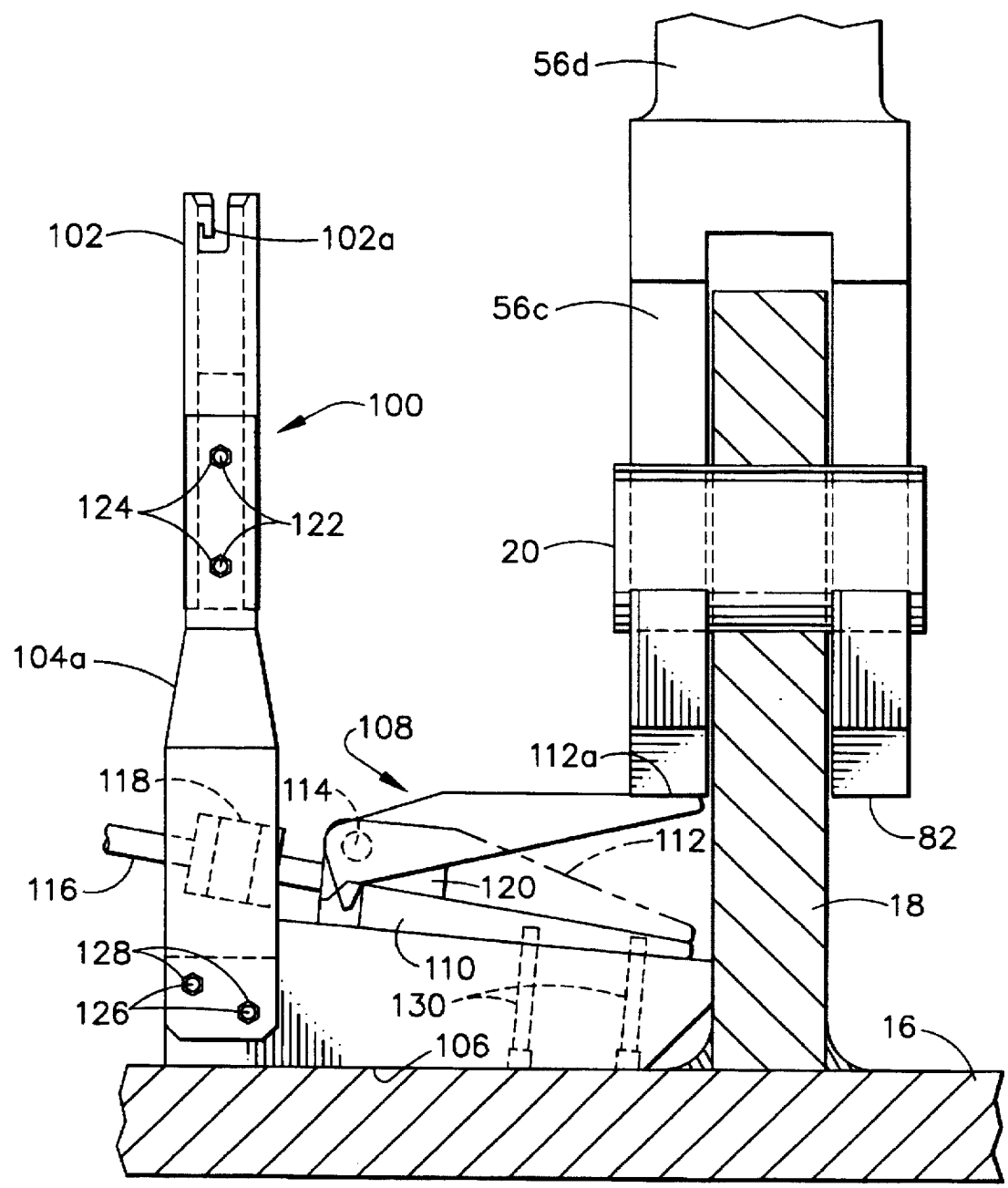
FIG. 4 is a side view of the tool for vertically supporting the tie rod/lower spring assembly in accordance with a preferred embodiment of the invention, the pole adaptor being depicted in section. For ease of depiction, the tool is shown disposed generally transverse to the plane of the gusset plate. The solid lines indicate the open state in which the tool supports the tie rod/lower spring assembly; the dashed lines indicate the closed state in which the tool is not supporting the tie rod/lower spring assembly.

Referring to FIG. 4, the vertical support tool 100 in accordance with the preferred embodiment comprises a pole adaptor 102 for coupling to the end of a service pole (not shown). In particular, pole adaptor 102 has a pair of J-shaped slots 102a (only one of which is visible in FIG. 4) for receiving respective pins on the end of the service pole (not shown). The vertical support tool further comprises a pair of pole adaptor extensions 104a and 104b having a nonlinear profile, as best seen in FIG. 5. The upper ends of extensions 104a, 104b are attached to the lower end of the pole adaptor 102 by means of screws 122 and nuts 124. The lower ends of extensions 104a, 104b are attached to a mounting block 106 by means of screws 126 and nuts 128, screws 126 being longer than screws 122. The extensions 104a, 104b and mounting block 106 form a generally L-shaped assembly, as seen in FIG. 4. The pole adaptor 102 and mounting block 106 are preferably made of aluminum alloy; the extensions 104a, 104b are made of a suitable stainless steel.

The mounting block 106 has a generally flat bottom surface, which facilitates seating of the mounting block on the shroud support plate 16, and an inclined top surface, on which a hydraulic spreader or pry bar 108 is mounted. The hydraulic spreader, which resembles a duckbill, has a fixed member or jaw 110 attached to the mounting block 106 by screws 130 and a pivoting member or jaw 112 which is pivotably coupled to the fixed member 110 by means of a pivot pin 114. The pivoting member 112 pivots relative to the fixed member 110 about an axis which lies generally parallel to the flat bottom surface of mounting block 106 in response to the supply of pressurized fluid, e.g., water, to a hydraulic cylinder 120 situated between the fixed and pivoting members. Hydraulic cylinder 120 is arranged such that the pivoting member 112 is pushed open when the piston of the hydraulic cylinder is extended. In the open position, upper surface 112a (see FIG. 4) of pivoting member 112 bears against a bottom surface 82 of the clevis hook 54c with sufficient force to hold the tie rod assembly against the clevis pin 20 during subsequent installation procedures. The upper surface of mounting block 106 is machined with an angle of inclination such that the upper surface 112a of the hydraulic spreader 108 will be generally horizontal when it contacts the surface 82 of the clevis hook.

The hydraulic cylinder 120 is connected to a source (not shown) of pressurized fluid via a hydraulic line 116 and a quick disconnect coupling 118. The piston of hydraulic cylinder is extended when pressurized fluid, e.g., water, is supplied to the cylinder and retracted when the supply of pressurized fluid is cut off. The end of the piston contacts the pivoting member 112 of hydraulic spreader 108 at a point which is offset from the axis of pivot pin 114. Thus, extension of the piston in response to actuation of the hydraulic cylinder produces a torque on the pivoting member 112 which causes it to rotate away from the fixed member 110. As indicated by solid lines in FIG. 4, the pivoting member 112 rotates away from fixed member 110 until its upper surface 112a bears against a bottom surface 82 of one arm of the clevis hook 54c. The pressure supplied to the hydraulic cylinder is preferably sufficient to produce an upward vertical force on bottom surface 82 which is greater than the total weight of the tie rod assembly. Similarly, a second vertical support tool (not shown), identical in construction to tool 100, can be installed on the other side of the gusset plate 20, where it supports the other arm of the clevis hook 54c against the clevis pin.

After the vertical support tool has been properly installed, the service pole can be manipulated to uncouple the tool, leaving the tool in place during subsequent shroud repair hardware installation procedures. These procedures include installing the upper support structure 62 such that hooks 64a thereof are hooked on the inner circumference of the shroud dam 24 and the threaded top end of the tie rod 54 penetrates the support block 66, and then torquing nut 70 onto the threaded top end of the tie rod with sufficient torque to vertically support the tie rod assembly. The vertical support tools of the invention can be removed at any stage subsequent to the nut torquing operation.

In practice, the hydraulic spreader 108 should have at least a 1-ton capacity at 10,000 psi. Preferably, a spring return is provided so that the pivoting member retracts automatically when the hydraulic pressure is released.

The preferred embodiment of the vertical support tool in accordance with the present invention has been disclosed for the purpose of illustration. Variations and modifications of the disclosed structure which fall within the concept of this invention will be readily apparent to persons skilled in the art of tooling design. All such variations and modifications are intended to be encompassed by the claims set forth hereinafter.

I claim:

1. A tool for vertically supporting a member inside a reactor pressure vessel, comprising:

a pole adaptor having means for coupling to an end of a service pole;

a support structure connected to said pole adaptor;

a pivoting member pivotably mounted on said support structure; and a hydraulic drive mechanism supported by said support structure and coupled to said pivoting member so that said pivoting member pivots about an axis in a direction away from said support structure in response to the supply of pressurized fluid to said hydraulic drive mechanism, wherein said support structure comprises a mounting block having a flat bottom surface, and said pivoting member pivots about said axis which lies parallel to a plane of said flat bottom surface of said mounting block.

2. The tool as defined in claim 1, wherein said support structure further comprises an extension having one end attached to said pole adaptor and another end attached to said mounting block so that said extension and said mounting block form a generally L-shaped assembly.

3. The tool as defined in claim 1, wherein said coupling means comprises a generally J-shaped slot.

4. A tool for vertically supporting a member inside a reactor pressure vessel, comprising:

a pole adaptor having means for coupling to an end of a service pole;

a support structure connected to said pole adaptor;

a pivoting member pivotably mounted on said support structure; and a hydraulic drive mechanism supported by said support structure and coupled to said pivoting member so that said pivoting member pivots about an axis in a direction away from said support structure in response to the supply of pressurized fluid to said hydraulic drive mechanism, wherein said hydraulic drive mechanism comprises a hydraulic cylinder having a piston which extends along a line which is offset from said axis.

5. A tool for vertically supporting an assembly at a predetermined depth inside a reactor pressure vessel filled with water, comprising:

a pole adaptor for coupling to an end of a service pole;

a support structure connected to said pole adaptor;

a hydraulic spreader mounted on said support structure and having open and closed states; and a hydraulic line for connecting said hydraulic spreader to a supply of pressurized fluid, wherein said hydraulic spreader comprises a fixed jaw attached to said support structure, a pivoting jaw pivotably coupled to said fixed jaw by means of a pivot pin having a pivot axis, and a hydraulic cylinder coupled to said hydraulic line and having one end mounted to said fixed jaw, and said hydraulic spreader transitions from said closed state to said open state as said pivoting jaw rotates upward and away from said fixed jaw in response to the supply of pressurized fluid to said hydraulic line.

6. The tool as defined in claim 5, wherein said support structure comprises a mounting block having a flat bottom surface, and said pivot axis lies parallel to a plane of said flat bottom surface of said mounting block.

7. The tool as defined in claim 6, wherein said mounting block has an inclined top surface having an angle of inclination such that a top surface of said pivoting jaw is generally horizontal when it contacts a bottom surface of a clevis hook.

8. The tool as defined in claim 6, wherein said support structure further comprises an extension having one end attached to said pole adaptor and another end attached to said mounting block so that said extension and said mounting block form a generally L-shaped assembly.

9. The tool as defined in claim 5, wherein said pole adaptor has a generally J-shaped slot for coupling with a service pole.

10. The tool as defined in claim 7, wherein said hydraulic cylinder comprises a piston which extends along a line which is offset from said pivot axis.

11. A tool for vertically supporting an assembly at a predetermined depth inside a reactor pressure vessel filled with water, comprising:

a pole adaptor for coupling to an end of a service pole;

a support structure connected to said pole adaptor;

a hydraulic spreader mounted on said support structure and having open and closed states; and a hydraulic line for connecting said hydraulic spreader to a supply of pressurized fluid, wherein said hydraulic spreader transitions from said closed state to said open state in response to the supply of pressurized fluid to said hydraulic line and has a footprint which fits in an area bounded by a jet pump diffuser, a gusset plate and a wall of the reactor pressure vessel.

12. The tool as defined in claim 11, wherein said support structure comprises a mounting block having a flat bottom surface, and said hydraulic spreader comprises a pivoting member which pivots about an axis which lies parallel to a plane of said flat bottom surface of said mounting block.

13. The tool as defined in claim 12, wherein said mounting block has an inclined top surface having an angle of inclination such that a top surface of said pivoting member is generally horizontal when it contacts a bottom surface of a clevis hook.

14. The tool as defined in claim 12, wherein said support structure further comprises an extension having one end attached to said pole adaptor and another end attached to said mounting block so that said extension and said mounting block form a generally L-shaped assembly.

15. The tool as defined in claim 11, wherein said pole adaptor has a generally J-shaped slot for coupling with a service pole.

16. The tool as defined in claim 13, wherein said hydraulic spreader further comprises a hydraulic cylinder having a piston which extends along a line which is offset from said axis.

* * * * *